US012673446B2

(12) United States Patent
Ambrogiani et al.

(10) Patent No.: US 12,673,446 B2
(45) Date of Patent: Jul. 7, 2026

(54) MECHANISM WITH CAMS FOR ENGRAVING AND SPLITTING TILES

(71) Applicants: SIGMA DI AMBROGIANI SERGIO & C. S.a.s., Bellaria-Igea Marina (IT); Valter Ambrogiani, Bellaria-Igea Marina (IT)

(72) Inventors: Valter Ambrogiani, Bellaria-Igea Marina (IT); Luca Ambrogiani, Bellaria-Igea Marina (IT)

(73) Assignees: SIGMA DI AMBROGIANI SERGIO & C.S.A.S., Igea Marina (IT); AMBROGIANI, VALTER, Igea Marina (IT)

( * ) Notice: Subject to any disclaimer, the term of this patent is extended or adjusted under 35 U.S.C. 154(b) by 921 days.

(21) Appl. No.: 17/715,212

(22) Filed: Apr. 7, 2022

(65) Prior Publication Data

US 2022/0324139 A1 Oct. 13, 2022

(30) Foreign Application Priority Data

Apr. 8, 2021 (IT) ........................ 202021000001775

(51) Int. Cl.
*B28D 1/22* (2006.01)
*B28D 7/04* (2006.01)

(52) U.S. Cl.
CPC ............. *B28D 1/225* (2013.01); *B28D 7/043* (2013.01)

(58) Field of Classification Search
CPC .......... B28D 1/225; B28D 1/22; B28D 7/043; B28D 7/04; B26D 3/08
USPC ............................................ 125/23.02, 23.01
See application file for complete search history.

(56) References Cited

U.S. PATENT DOCUMENTS 2,568,816 A * 9/1951 Marus .................... B28D 1/225 125/23.02
5,040,521 A * 8/1991 Pourtau .................. B28D 1/225 125/23.02
5,331,877 A * 7/1994 Ishii ....................... B28D 1/225 83/676
2009/0044681 A1* 2/2009 Torrents ................ B28D 1/225 83/886
2010/0059402 A1 3/2010 Burattini

FOREIGN PATENT DOCUMENTS

EP 1903599 A2 3/2008
EP 2708341 A1 * 3/2014 ............. B23D 47/02

OTHER PUBLICATIONS

Russian Office Action dated Mar. 14, 2022 from counterpart Russian Patent Application No. 2020129164/05 (0052183).

* cited by examiner

*Primary Examiner* — Monica S Carter
*Assistant Examiner* — Kent N Shum
(74) *Attorney, Agent, or Firm* — SHUTTLEWORTH & INGERSOLL, PLC; Timothy J. Klima

(57) ABSTRACT

This invention relates to a mechanism for scoring and splitting tiles usable on manual tile cutter machines of the type preferred for cutting extra-thick tiles.

14 Claims, 7 Drawing Sheets

Fig. 5
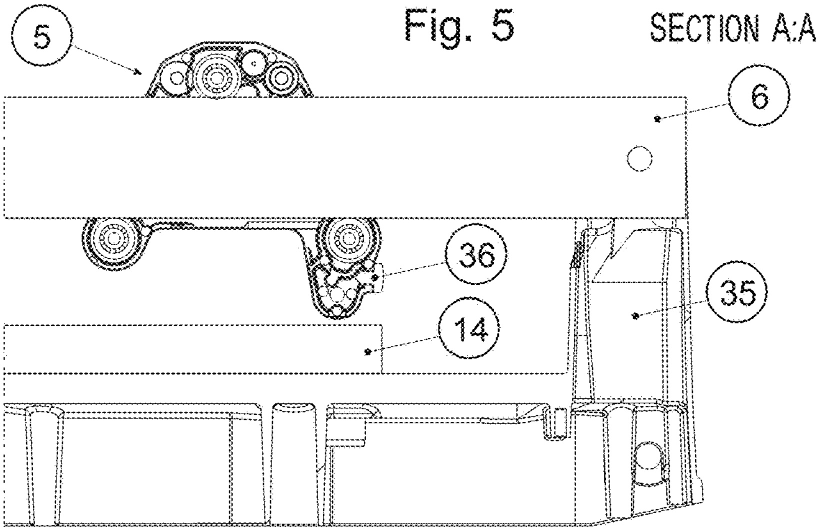
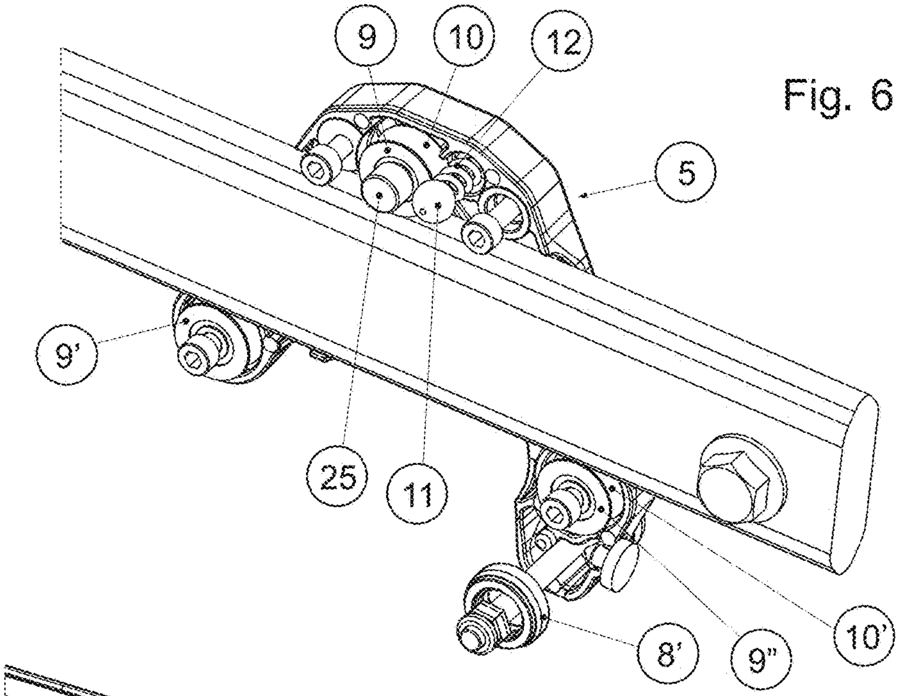
Fig. 6
Fig. 7
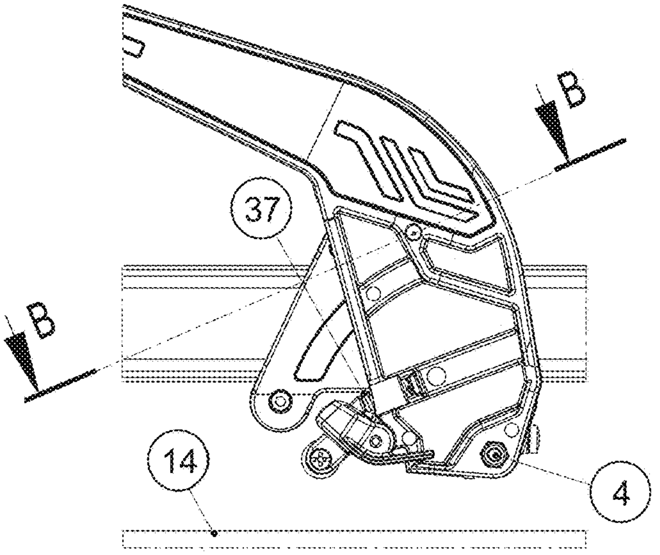

SECTION D-D

MECHANISM WITH CAMS FOR ENGRAVING AND SPLITTING TILES

This application claims priority to Italian Patent Application 202021000001775 filed Apr. 8, 2021, the entirety of which is incorporated by reference herein.

BACKGROUND OF THE INVENTION

This invention relates to a mechanism for scoring and splitting tiles usable on manual tile cutter machines of the type preferred for cutting extra-thick tiles.

There are already various types of manual tile cutter machines available for sale, which concentrate on the ability to score and break tiles; these are divided into two categories: those which have the scoring tool or the splitting tool movable relative to the operating handle, and those which have the scoring tool and splitting tool fixed to the operating handle. Versions with movable tools are preferred for cutting extra-thick tiles which require strong scoring, whilst versions with integrated and fixed tools are preferred for cutting large tiles at maximum speed in the minimum time. The versions of the type preferred for cutting extra-thick tiles are currently formed by a main body joined with a pin to an oscillating unit comprising the scoring tool and the splitting foot, the main body in turn is coupled in such a way that it can oscillate to a carriage which runs on a multi-material rail for scoring the surface of the tile; the carriage being guided by three rolling bearings placed in a single plane.

DISADVANTAGES IN THE PRIOR ART

In the existing scoring and splitting mechanisms, of the type with a carriage provided with a single set of bearings placed in a single plane, the guiding rail is composed of an extruded aluminum profile coupled to steel tracks. The fact that the rail is mainly made of aluminum, forces the manufacturer to use a large cross-section in order to guarantee the necessary strength; the size of the cross-section causes significant visibility problems for the operator who, from above the mechanism, struggles to see the line to be scored.

Another disadvantage of this type of rail is the play necessary for assembly which must be left in the coupling between the extruded aluminum profile and the steel tracks; this play affects the precision and straightness of the scoring line.

Another disadvantage is the fact that the natural balance of the main body causes the splitting foot or the scoring wheel to always fall downwards, far below the surface of the tile to be worked; this forces the operator who wants to cut a tile to lift the movable part of the mechanism with one hand, and with the other hand insert the tile on the cutting surface of the machine and below the scoring and splitting units; this action may be feasible when cutting small and light tiles, but is impossible with current tiles which may weigh tens of kilograms. If the operator lets go of the movable body over the tile, in order to handle the tile with two hands during insertion, the foot may get jammed in non-slip projections of the tile and the wheel may ruin the surface and the glaze, by scraping over it.

Another disadvantage is caused by the system with traction springs used until now in order to swap the position of the scoring unit with that of the splitting unit. The traction springs have the defect of not being reliable enough and of easily breaking, in order to keep the body centered two springs are always needed, plus it is not possible to manage the swap speed between scoring tool and splitting tool, moreover being outside the movable body, they prevent the addition of levers for facilitating manual swapping between scoring tool and splitting tool.

Another disadvantage is caused by wear on the scoring unit bearing; if the scoring unit made of tungsten carbide strongly scores materials which are not very abrasive, the sharpening remains effective whilst the bearing undergoes premature wear, causing vibrations and meandering scoring. In order to solve the problem the whole scoring unit composed of wheel and bearing must be substituted, or a press must be used to disassemble the scoring unit.

SUMMARY OF THE INVENTION

The aim of this invention is to remove the above-mentioned disadvantages, the invention as characterized in the claims, in order to achieve the aim: (a) joins together the materials of the rail in a single metal extruded profile, (b) provides the mechanism with an automatic system for locking in the raised position so as to facilitate tile insertion, (c) uses a cam to manage the swap between scoring tool and splitting tool, (d) creates at least one lever to facilitate manual swapping from the splitting position to the scoring position, (e) adopts a solution for fast substitution of the scoring wheel bearing.

BRIEF DESCRIPTION OF THE DRAWINGS

Further advantages and features of the invention will be more apparent in the detailed description which follows, with reference to the accompanying drawings, which show an example, non-limiting embodiment, in which:

FIG. 5 shows the invention in cross-section according to the line in FIG. 4.

FIG. 6 and FIG. 24 show the carriage 5 in two versions, without one of the two covers, mounted on the guide 6, according to an axonometric side view.

FIG. 7 is a side view of the invention in the automatic locking position.

DESCRIPTION OF THE PREFERRED EMBODIMENTS

Figure 1:
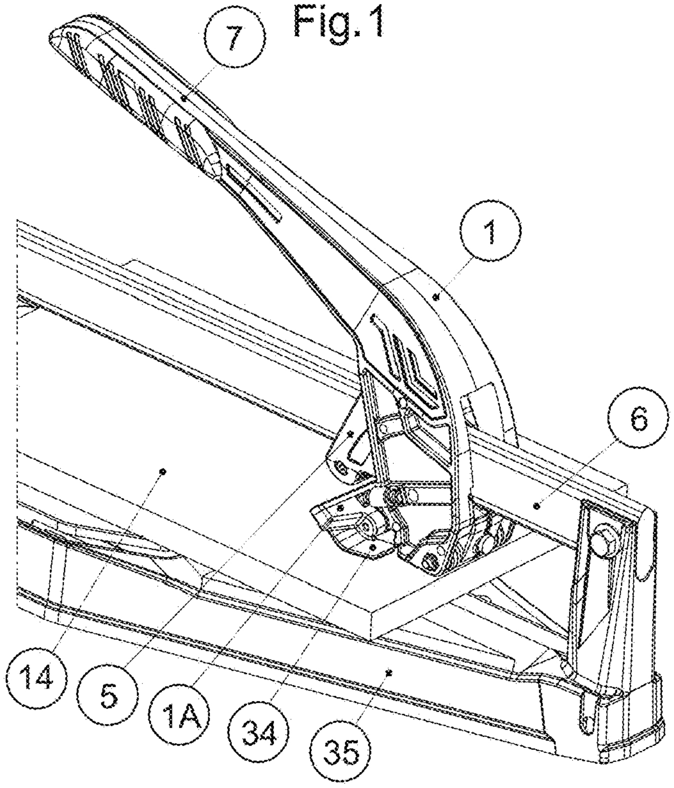
FIG. 1 shows the invention mounted on a tile cutter base, during scoring of a tile, according to an axonometric partial side view.
Figure 2:
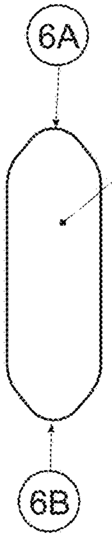
FIG. 2 shows only the cross-section of an example guide 6 of the invention.

As can be seen from FIG. 1 the invention relates to a mechanism for scoring and splitting tiles. The invention identifies a device which comprises:

a main body 1 a scoring and splitting body 1C a carriage 5 a guide 6 a handle 7

The invention which is the subject matter of this patent comprises a guide 6 extruded in one piece, provided with an upper side 6A and a lower side 6B having a shape which is not flat.

It also comprises a carriage 5 with a single set of at least two bearings 9-9'-9", which are placed in a single vertical plane; the rim 10-10' of these bearings has a shape which is not flat, in order to adapt to the shape which is not flat of the upper and lower sides of the guide 6. The coupling of the guide 6 with the bearings 9-9'-9" allows the invention to run along the guide without friction and without play, guaranteeing perfectly straight scoring. The perfect coupling of the bearings with the guide is favored by the presence, on one of them, of at least one housing 25-25' for the pin 24, the housing made of yielding material, or in an alternative construction, the pin 24 is retained by an adjustable rigid unit 38.

In the mechanism according to the invention, the main body 1 rotates concentric on the second pin 4, at the point of contact there are thrust bearings 8-8' present which prevent any play between carriage 5 and main body 1.

The fact that the bearings 9-9'-9" are placed in a single vertical plane gives the advantage of being able to use guides 6 with different cross-section in order to adapt to the resistance required by the length of the tile cutter machine, without modifying the shape of the carriage 5.

The invention comprises a temporary and automatic stop device 40, composed of at least one interference element 11-11' pushed by an elastic element 12 against a seat 13-13'. This stop device 40 is positioned in such a way as to operate when the splitting unit 2 and the scoring unit 3 are both at a distance from the surface of the tile 14; a slight increase in the force applied on the handle 7 by the operator, if directed downwards allows releasing of the stop device 40 and the start of a new scoring or splitting operation, if directed upwards allows releasing of the stop device 40 and the start of a step of overturning the scoring and splitting body 1C, from the scoring position to the splitting position.

The invention comprises a scoring and splitting body 1C, which pivoting on the third pin 4A oscillates to swap the splitting unit 2 and the scoring unit 3 with each other. In order to implement a uniform rotation the invention comprises a cam 32 on which an interference element 11A pushed by elastic element 12A acts, it also comprises a second cam 33 which acts on the lower side 6B of the guide 6. In order to rotate the scoring and splitting body 1C from the splitting position to the scoring position, the invention is provided with at least one lever 34-34' to be operated manually.

The mechanism according to the invention is provided with a scoring unit 3 provided with a rapid-disassembly rolling bearing 29. Existing scoring units (JP2002331516A-CN202918256U) often have the inner bearing subject to premature wear, the bearing being rigidly assembled to the scoring wheel without the possibility of disassembly and substitution. In the prior art the anchoring means 60 comprise entrances 62-62' whose dimensions are smaller than those of the rolling bearing 29, so that mounting of the rolling bearing 29 is only possible in a radial direction relative to the entrances 62-62'. The scoring unit according to the invention solves this problem by allowing rapid substitution of the bearing; this result is obtained with the clever solution of having constrained the shaft 16 to the structure of the scoring unit 3, resting on the head 19 of the shaft 16, or resting on the stop nut 18.

With this solution it is possible to easily substitute the roller bearing 29 which supports the scoring wheel 15, because to disassemble and extract the bearing use is made of the entrance 62' which is the housing necessary for the nut 18, or use is made of the entrance 62 which is the housing necessary for the head 19 of the pin 16.

DETAILED DESCRIPTION WITH SPECIAL REFERENCE TO THE FIGURES

In FIG. 1 the invention is mounted on a base 35 and is working a tile 14.

Distinctive Features of the Invention:

(A) FIGS. 2-6 reference. Showing the cross-section of the guide 6 highlighting the upper side 6A and the lower side 6B having a shape which is not flat, for coupling to the bearings 9-9'-9" present on the carriage 5, being transversally constrained and maintaining the possibility of running longitudinally along the guide.

The remaining sides may have different shapes in order to adapt the cross-section of the profile to the required resistance.

Figure 3:
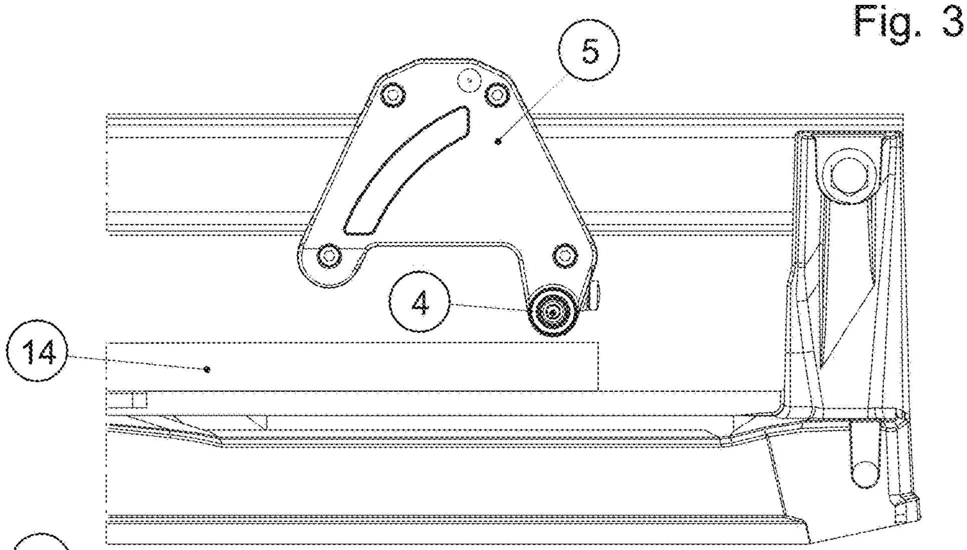
FIG. 3 shows the invention where the main body 1 and scoring and splitting body 1C are hidden, according to a partial side view.
Figure 4:
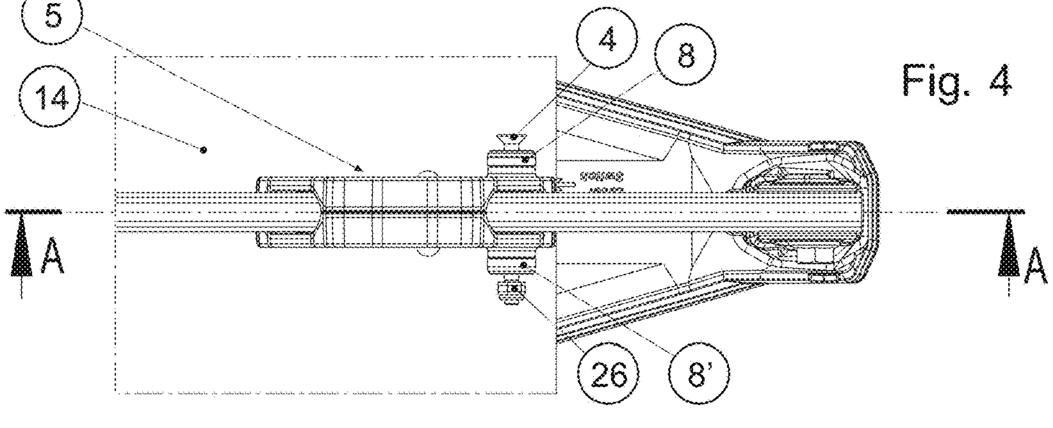
FIG. 4 is a top view of the invention of FIG. 3.

(B) FIGS. 3 and 4 reference. In FIG. 3 the main body 1 is hidden so as to clearly show the carriage 5. In FIG. 4 (which is the top view of FIG. 3) the second pin 4 is seen, which is used together with the nut 26 to clamp the sides 1A and 1B of the main body 1 on the thrust bearings 8-8', in such a way as to leave only a rotary movement relative to the carriage 5 possible.

(C) FIGS. 5-6 reference. The result of the cross-section A:A of FIG. 4 is shown, to highlight the bearings 9-9'-9" placed in a single plane. In FIG. 6 the two rigidly fixed lower bearings 9'-9" are seen, the upper bearing 9 is provided with a yielding housing 25 in order to compensate for any small size differences of the guide 6; the bearing 9 connects to the housing 25 using the pin 24. The invention comprises a bumper 36 to protect the base 35 from impacts by the carriage 5.

Figure 24:
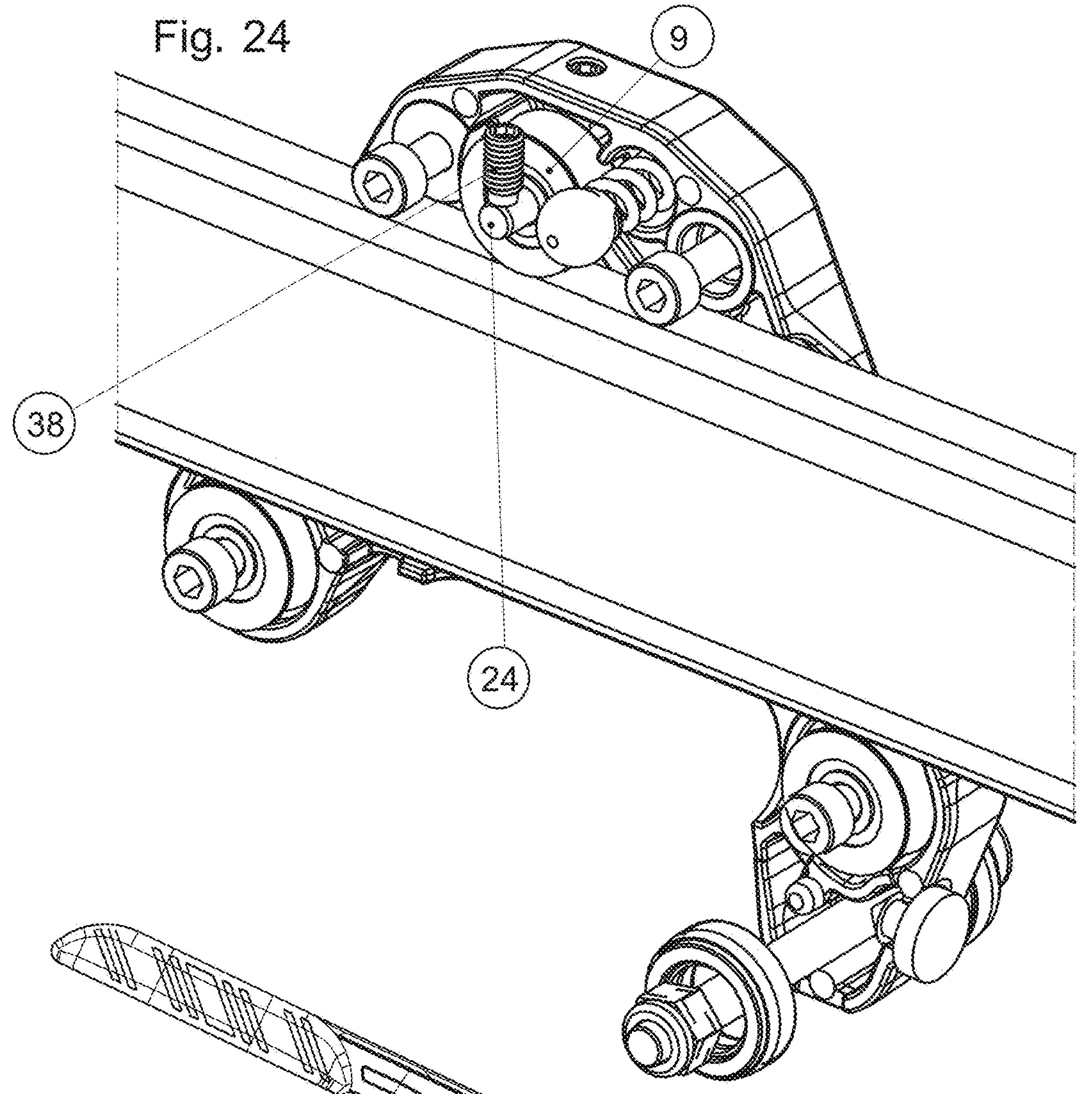
Figure 23:
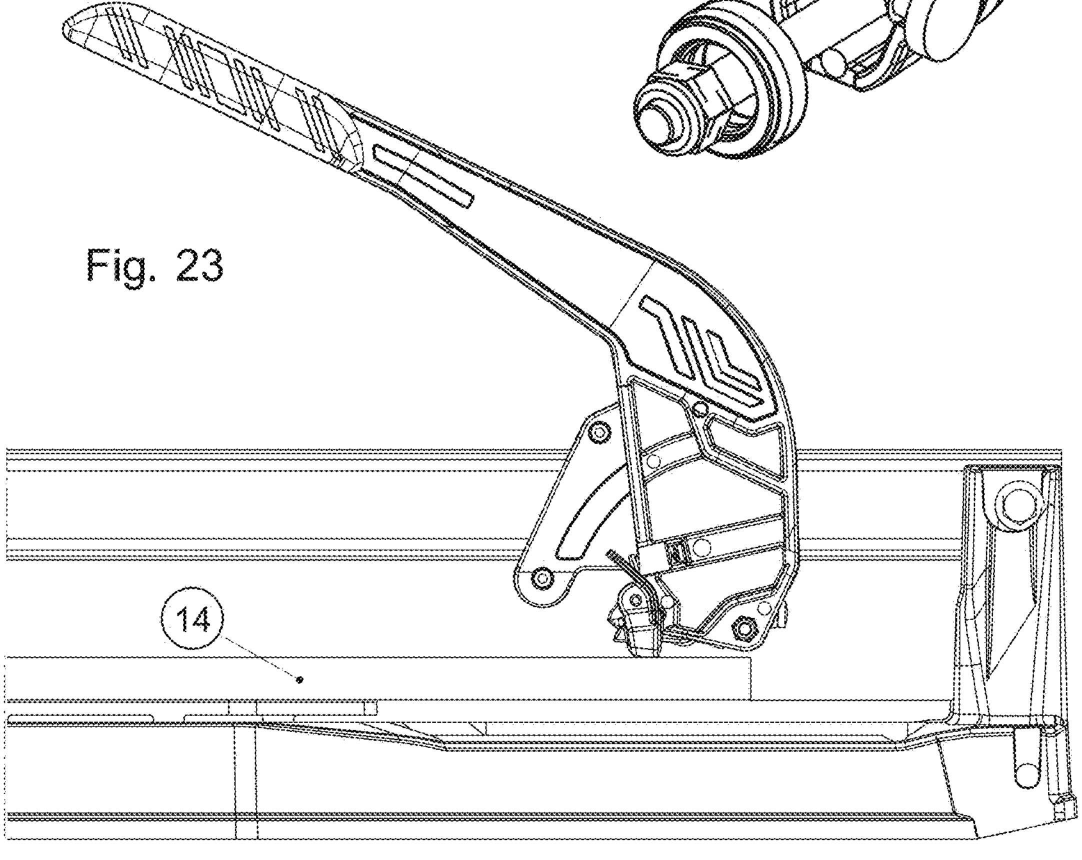
FIG. 23 shows the invention in the splitting position.

In FIG. 24 the upper bearing 9 is provided with an adjustable rigid unit 38, used to compensate for small size differences of the guide 6; the bearing 9 connects to the adjustable rigid unit 38 using the pin 24.

(D) FIG. 7 reference. The invention is shown in the automatic hooking position of the stop device 40 described in more detail in FIG. 8. This figure shows the cutting plane B:B which passes through the axis of the pin 24 and the axis of the stop device 40.

Figure 8:
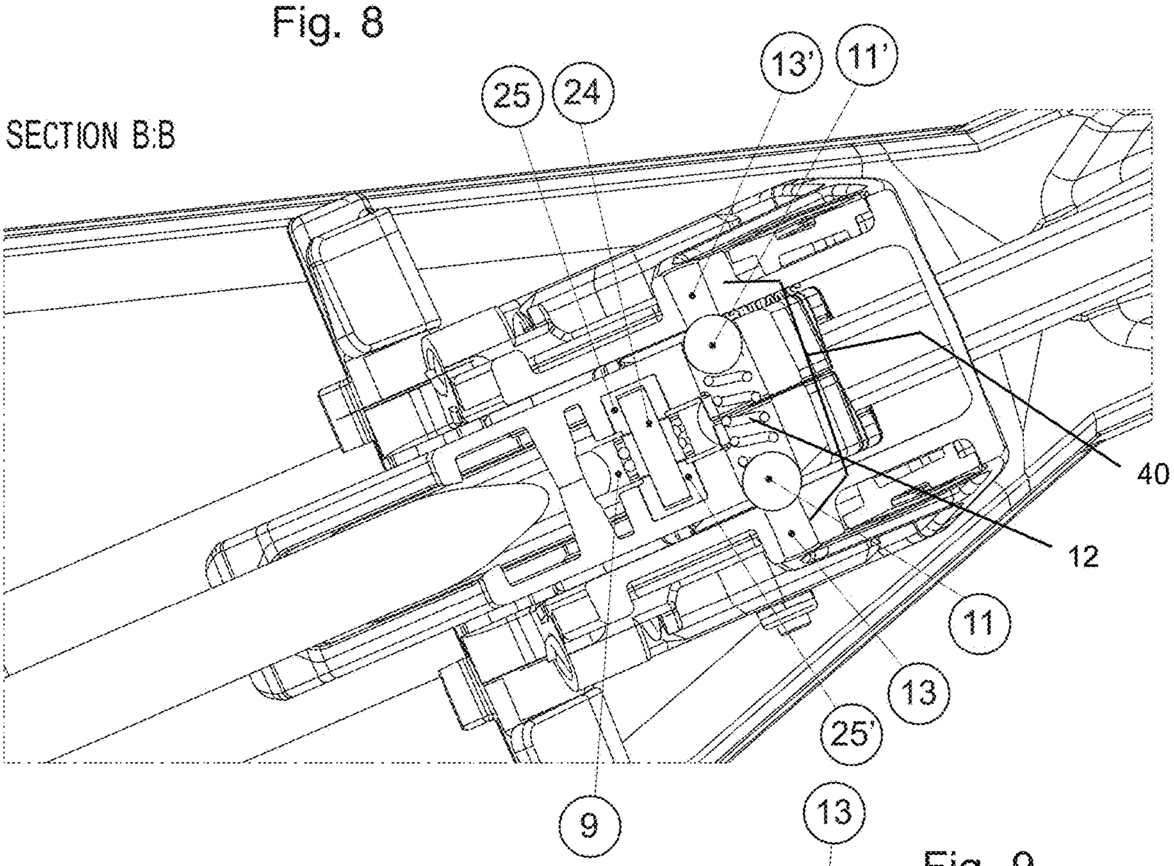
FIG. 8 shows the invention in cross-section according to the plane B-B of FIG. 7.

(E) FIG. 8 reference. This figure shows how the pin 24 supports the bearing 9 in a yielding way, resting on the housings 25-25'. This figure shows how the push rods 11-11' pushed by the elastic element 12 rest on the retaining points 13-13'.

Figure 9:
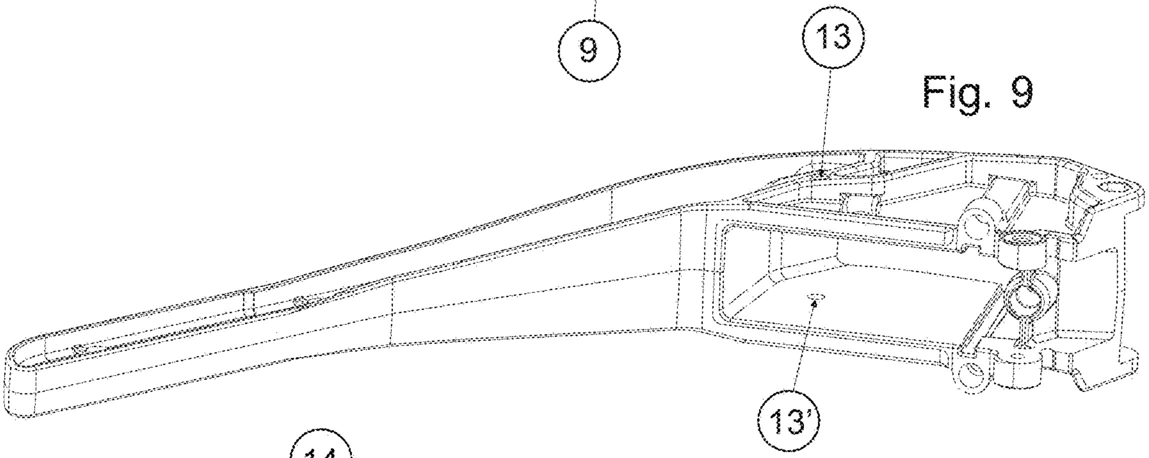
FIG. 9 is an axonometric rear view of the main body of the invention.

(F) FIG. 9 reference. This figure shows only the main body 1 highlighting the retaining points 13-13'. The parts forming this automatic stop device 40 may be substituted with components having equivalent operation and be placed on different parts of the mechanism.

Figure 10:
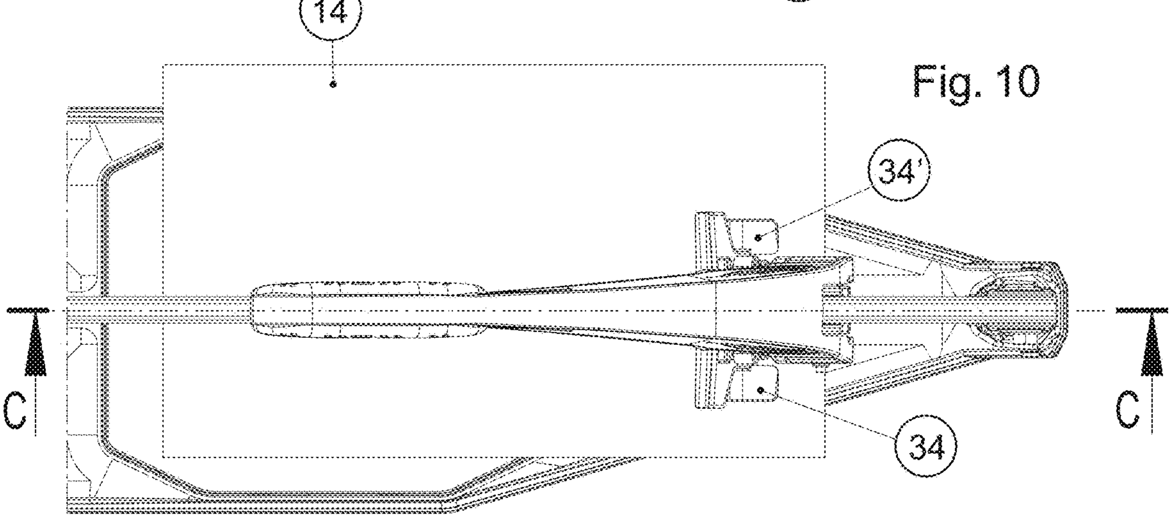
FIG. 10 is a top view of the invention.

(G) FIG. 10< >17 reference. FIG. 10 is a top view of the mechanism of FIG. 1. The cross-section C:C is used in FIGS. 11< >17 to show operation of the cam 32.

Figure 11:
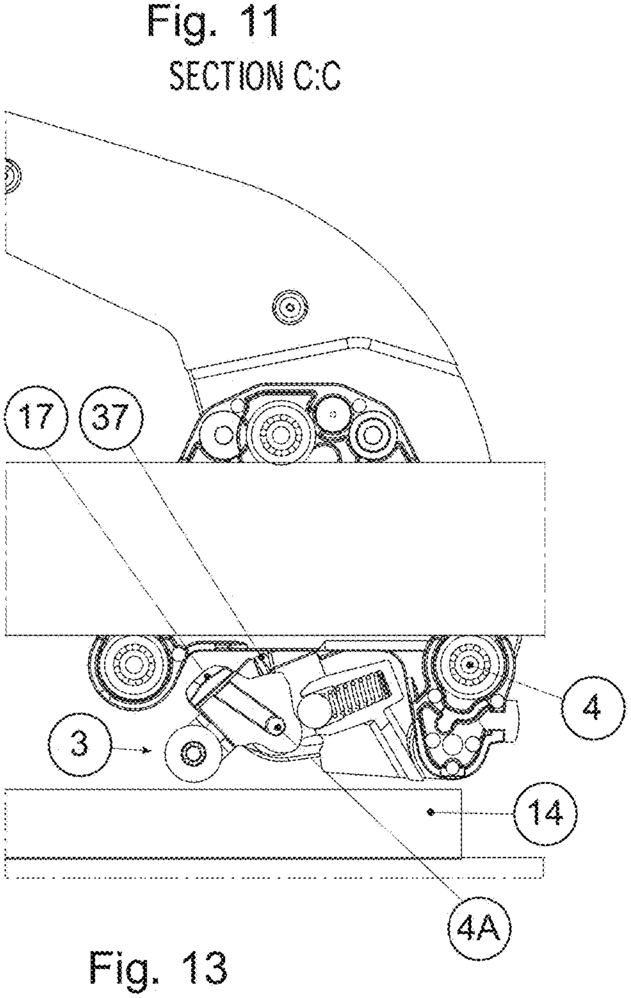
FIG. 11 shows the invention according to a detail view of the cross-section C:C of FIG. 10, in the automatic locking position No. 1.

In FIG. 11 the scoring and splitting body 1C is shown in the scoring position, resting on the spring 37 which is used to dampen the scoring of structured tiles. The main body 1 is in the stop device 40 position.

Figure 12:
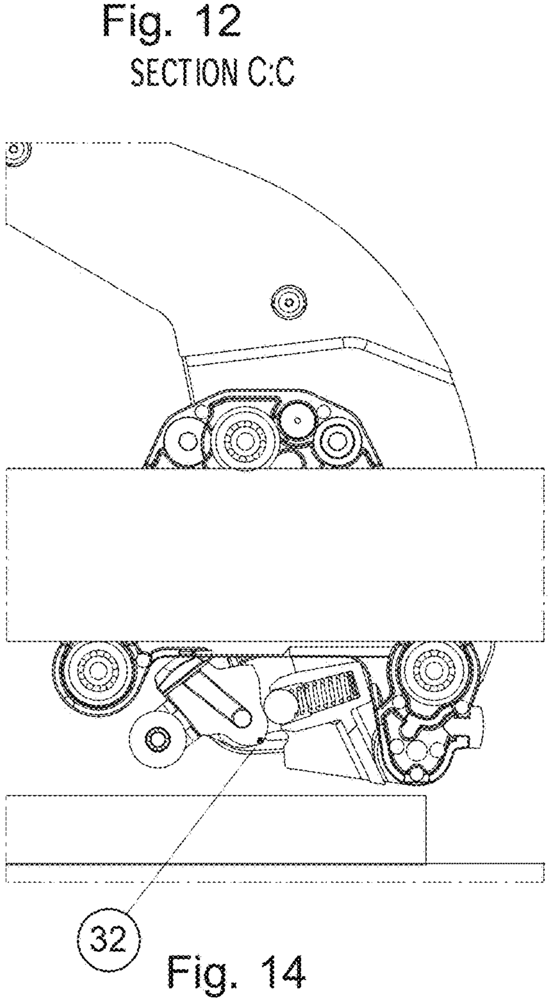
FIG. 12 shows the invention according to a detail view of the cross-section C:C of FIG. 10, in rotation position No. 2.

FIG. 12. Pulling the handle 7 upwards the stop device 40 is released and the protection surface 17 of the splitting unit 2 rests on the lower structure of the carriage 5.

Figure 13:
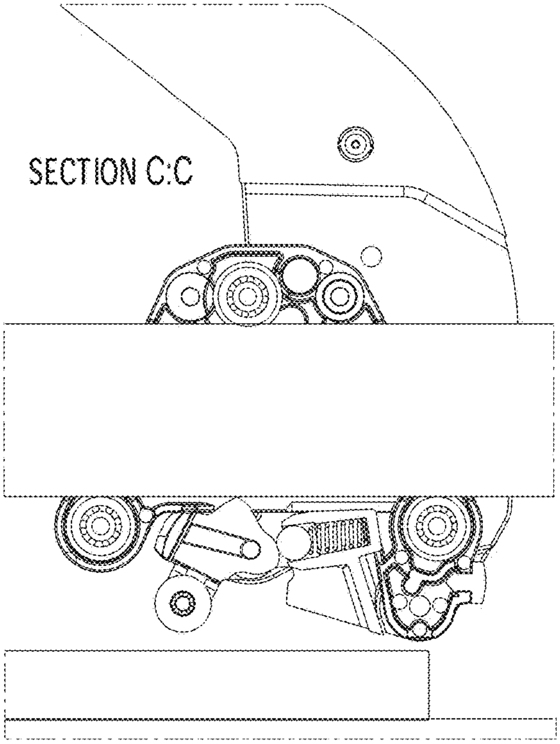
FIG. 13 shows the invention according to a detail view of the cross-section C:C of FIG. 10, in rotation position No. 3.

FIG. 13. Pulling the handle 7 upwards the cam 33 touches the lower side 6B of the guide 6.

Figure 14:
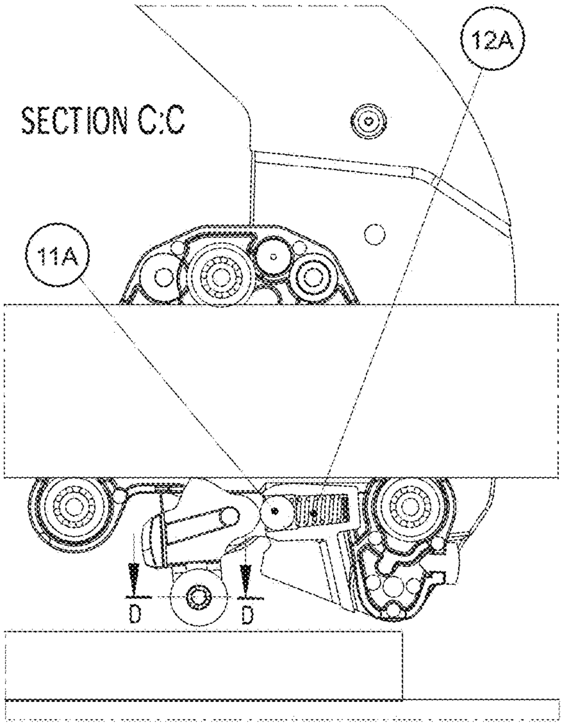
FIG. 14 shows the invention according to a detail view of the cross-section C:C of FIG. 10, in rotation position No. 4.

FIG. 14. Pulling the handle 7 upwards the interference element 11A applies maximum compression to the elastic element 12A and reaches the top of the cam 32.

Figure 15:
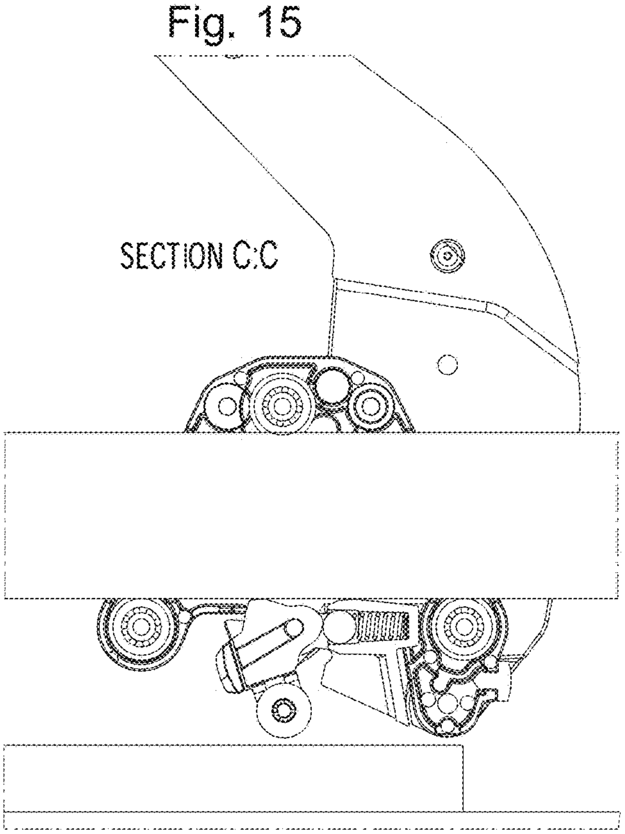
FIG. 15 shows the invention according to a detail view of the cross-section C:C of FIG. 10, in rotation position No. 5.

FIG. 15. Pulling the handle 7 upwards reaches the point at which the interference element 11A pushed by the elastic element 12A begins to descend the cam 32 spontaneously.

Figure 16:
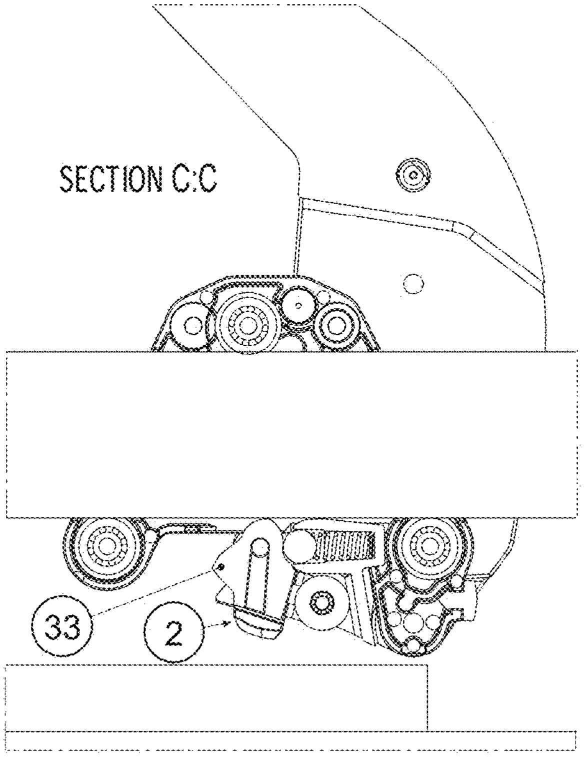
FIG. 16 shows the invention according to a detail view of the cross-section C:C of FIG. 10, in rotation position No. 6.

FIG. 16. Releasing the handle 7 downwards the scoring and splitting body 1C automatically goes to the splitting position, driven by the interference element 11A which applies force on the cam 32.

Figure 17:
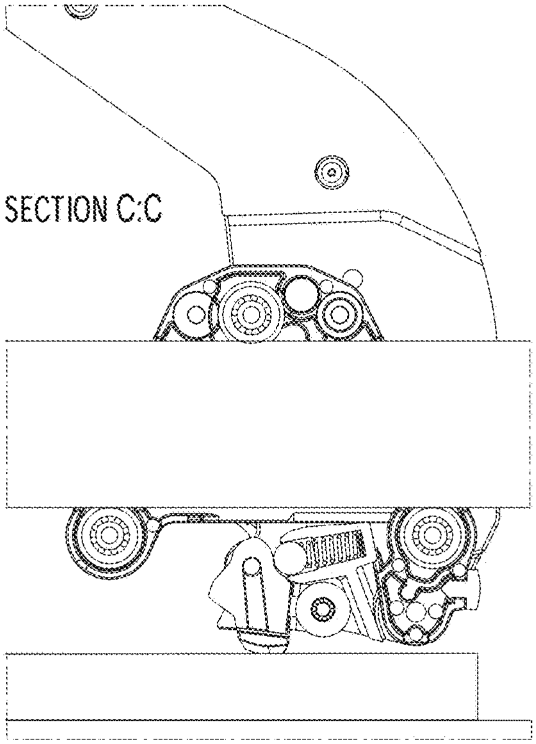
FIG. 17 shows the invention according to a detail view of the cross-section C:C of FIG. 10, in rotation position No. 7.

FIG. 17. Releasing the handle 7 downwards, the protection surface 17 touches the tile 14 ready for the splitting action.

Figure 18:
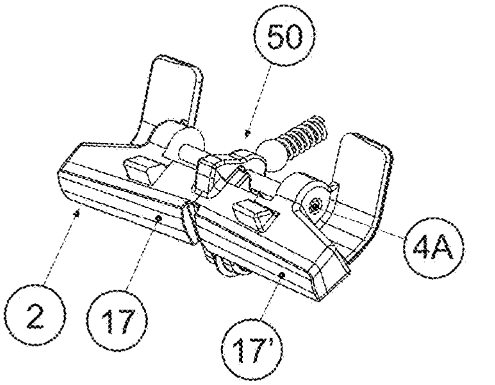
FIG. 18 is an axonometric rear bottom view of the scoring and splitting body 1C, joined to the interference element 11A and to the elastic element 12A of the invention.
Figure 19:
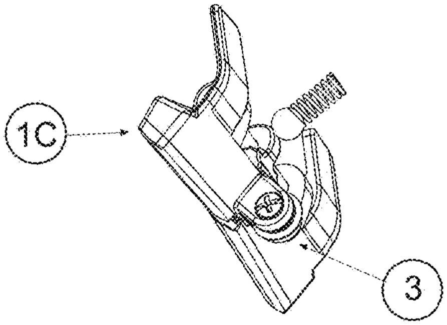
FIG. 19 is an axonometric side view of the scoring and splitting body 1C, joined to the interference element 11A and to the elastic element 12A of the invention.

FIG. 18-19. These show the scoring and splitting body 1C complete with protection surfaces 17-17' and scoring unit 3, defined in more detail below.

Figure 20:
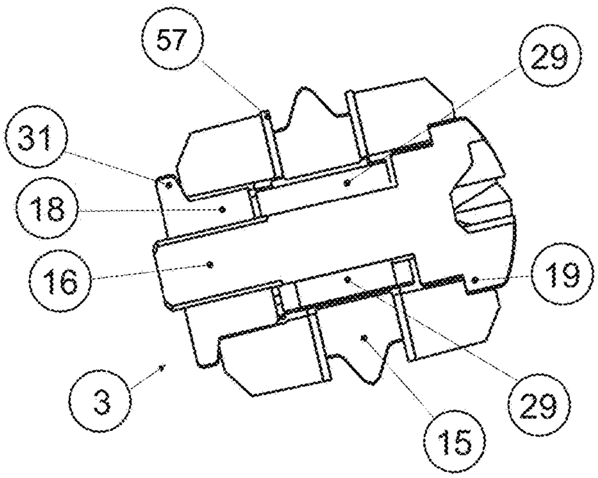
FIG. 20 shows the invention in cross-section according to the cross-section plane D:D of FIG. 14.
Figure 21:
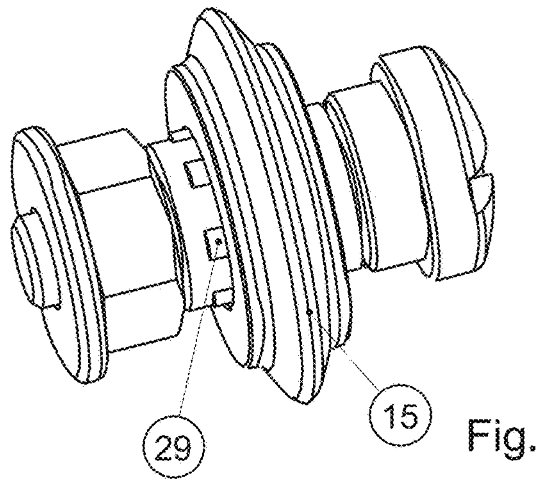
FIG. 21 is an axonometric bottom view of the components of the scoring unit of the invention without the wear-resistant protection.
Figure 22:
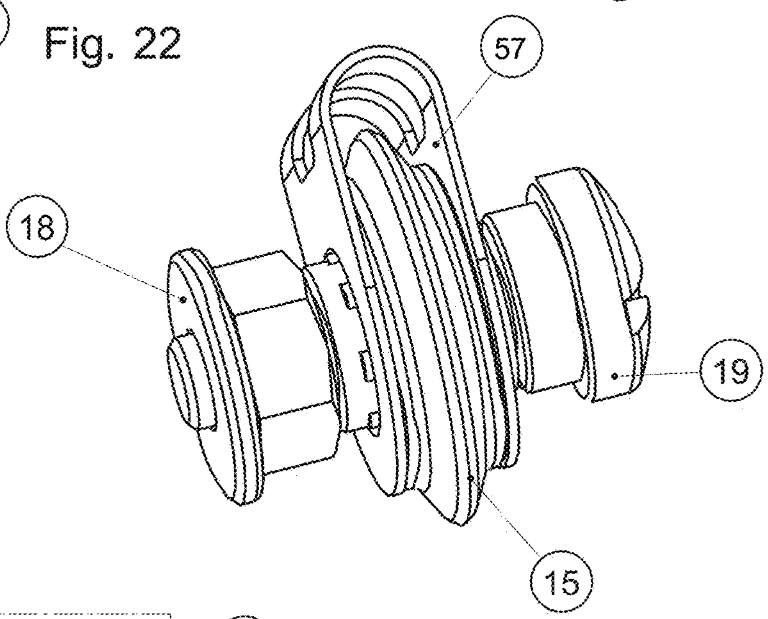
FIG. 22 is an axonometric bottom view of the components of the scoring unit of the invention.
Figure 22A:
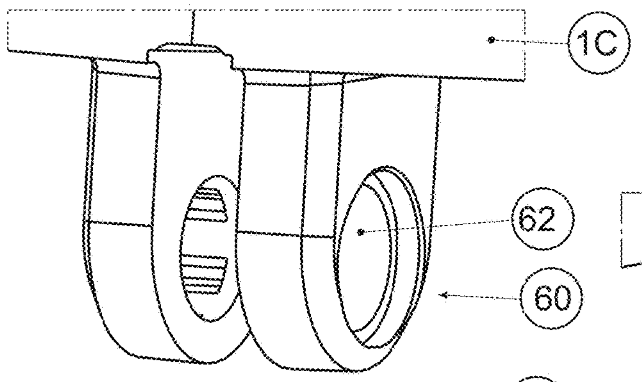
FIGS. 22A and 22B show an axonometric partial detail of the structure of the scoring and splitting body 1C.
Figure 22B:
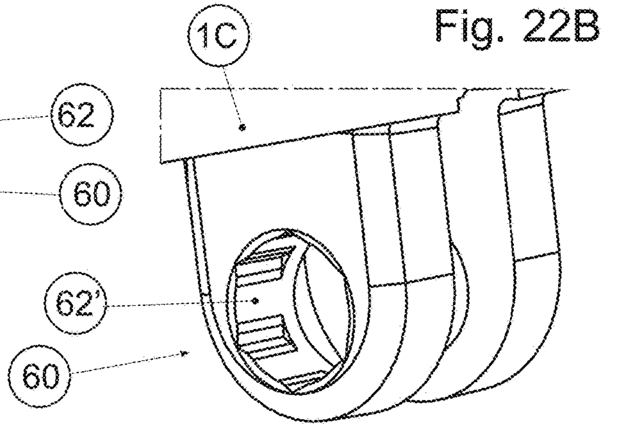

(H) FIGS. 20-21-22 reference. In a preferred embodiment the rolling bearing 29 which supports the scoring wheel 15 is inserted laterally through the hole which houses the stop nut 18 or through the hole which houses the head 19 of the shaft 16 which supports the load of the bearing; this solution allows a wheel 15 to be supported by an interchangeable rolling bearing 29, due to the vertical thrust and simultaneously to be supported transversally by a sacrificial guard 57 made of anti-friction material. FIG. 20 shows the cross-section D:D of FIG. 14, FIG. 21 shows the scoring unit 3 without the guard 57, FIG. 22 shows the scoring unit 3 complete with guard 57. FIG. 20 shows how it is the flange 31 of the stop nut 18 which prevents the nut 18 from shifting, and how it is the size of the head 19 which secures the shaft 16 in place.

The technical and innovative solutions illustrated with reference to a mechanism comprising a scoring and splitting body 1C are understood to also be applicable to mechanisms provided with a scoring unit 3 fixed to the main body 1 and a splitting unit 2 movable by oscillating and vice versa, and to mechanisms with a scoring unit 3 and a splitting unit 2 both fixed to the main body 1.

The invention described above may be modified and adapted in several ways without thereby departing from the scope of the inventive concept. Moreover, all details may be substituted with technically equivalent elements.

In use, obviously modifications and/or improvements are possible without thereby departing from the scope of the following claims.

What is claimed is:

1. A mechanism for scoring and splitting tiles, comprising:
- a main body;
- a carriage including a single set of bearings positioned in a single plane; and
- a running guide embodied as a single body;
- wherein the bearings engage the running guide to mount the carriage on the running guide to be axially movable along the running guide while the bearings maintain an angular orientation of the carriage with respect to the running guide; and
- wherein the main body is rotatably mounted to the carriage to be rotatable with respect to the carriage;
- a scoring and splitting body, movable relative to the main body;
- a movement device providing a pivotal mounting of the scoring and splitting body to the main body allowing the scoring and splitting body to pivot from a scoring position to a splitting position;
- wherein the movement device comprises a cam having a first cam portion, a cam follower engaging the first cam portion, and a spring elastically pressing the cam follower against the first cam portion.

2. The mechanism for scoring and splitting tiles according to claim 1, wherein at least one of the bearings comprises a housing made of at least partially of flexible material suitable for flexibly housing a pin.

3. The mechanism for scoring and splitting tiles according to claim 1, wherein at least one of the bearings comprises an adjustable rigid bearing suitable for housing a pin.

4. The mechanism for scoring and splitting tiles according to claim 1, wherein the carriage further includes a second pin comprising thrust bearings suitable for allowing only rotation of the main body on an axis of the second pin.

5. The mechanism for scoring and splitting tiles according to claim 4, and further comprising a stop device for stopping the main body relative to the carriage and suitable for interrupting the rotation of the main body.

6. The mechanism for scoring and splitting tiles according to claim 5, wherein the stop device comprises at least one interference surface operated by a spring.

7. The mechanism for scoring and splitting tiles according to claim 6, wherein the stop device comprises at least one seat as an obstacle for the at least one interference surface.

8. The mechanism for scoring and splitting tiles according to claim 1, wherein the scoring and splitting body comprises at least one protection surface and a scoring wheel.

9. The mechanism for scoring and splitting tiles according to claim 1, and further comprising a second cam portion which engages the running guide to rotate the scoring and splitting body.

10. The mechanism for scoring and splitting tiles according to claim 8, and further comprising a rolling bearing on which the scoring wheel rotates.

11. The mechanism for scoring and splitting tiles according to claim 10, and further comprising an anchor mount for mounting the scoring wheel to the scoring and splitting body, the anchor mount including at least one lateral entrance suitable for allowing passage of the rolling bearing.

12. The mechanism for scoring and splitting tiles according to claim 11, wherein the anchor mount further includes a shaft, a head, and a stop nut.

13. The mechanism for scoring and splitting tiles according to claim 8, and further comprising a guard in contact with the scoring wheel, the guard at least partly made of a low friction material.

14. The mechanism for scoring and splitting tiles according to claim 1, wherein the running guide is composed of a single extruded metal profile.

* * * * *